United States Patent [19]

Harnden, Jr.

[11] 3,719,789

[45] March 6, 1973

[54] INDUCTION COOKING APPLIANCE INCLUDING TEMPERATURE SENSING OF INDUCTIVELY HEATED COOKING VESSEL BY "MODULATED" LIGHT

[75] Inventor: John D. Harnden, Jr., Schenectady, N.Y.

[73] Assignee: General Electric Company

[22] Filed: Dec. 29, 1971

[21] Appl. No.: 213,352

[52] U.S. Cl. ......219/10.49, 219/10.77, 350/169 LC, 356/43
[51] Int. Cl. ..............................................H05b 5/08
[58] Field of Search..219/10.49, 10.75, 10.77, 10.79, 219/502; 356/43, 45, 48; 73/355; 350/160 LC

[56] References Cited

UNITED STATES PATENTS

| | | | |
|---|---|---|---|
| 3,114,836 | 12/1963 | Fergason et al. | 350/160 LC |
| 3,570,277 | 3/1971 | Dorr et al. | 73/355 |
| 3,519,352 | 7/1970 | Engborg | 356/43 |
| 3,256,417 | 6/1966 | Merrett | 219/10.79 |
| 3,530,499 | 9/1970 | Schroeder | 219/10.49 |

Primary Examiner—R. F. Staubly
Assistant Examiner—B. A. Reynolds
Attorney—John F. Ahern et al.

[57] ABSTRACT

Herein disclosed is an induction cooking range having a counter on which there is supported a cooking vessel to be inductively heated by an induction coil having a central aperture; the induction coil being located below the counter. The cooling vessel, or utensil, has at least on portion thereof coated or covered with a material which changes at least one optical property thereof in response to temperature changes. The coated portion of the vessel which rests on the counter covers a passage provided in the counter; said passage being axially aligned, or in register, with the central aperture of the coil. The range includes a temperature sensing unit comprising an LED for directing monochromatic light through the central aperture and passage onto the vessel's coating. The temperature sensing unit also includes a photodetector for detecting the light reflected from the coating whereby the temperature of the vessel is determinable. In another embodiment the counter is made of light transmitting material and the aforesaid passage is not required; the directed and reflected light passing through the counter.

19 Claims, 4 Drawing Figures

PATENTED MAR 6 1973

INDUCTION COOKING APPLIANCE INCLUDING TEMPERATURE SENSING OF INDUCTIVELY HEATED COOKING VESSEL BY "MODULATED" LIGHT

CROSS REFERENCES TO RELATED APPLICATIONS

A fuller appreciation of induction cooking appliances, as well as some of the sophistications which may be embodied therein, is to be had by referring to the following U.S. patent applications: Ser. No. 200,526, filed Nov. 19, 1971, in behalf of David L. Bowers et al., titled SOLID STATE INDUCTION COOKING APPLIANCE (RD–4675); Ser. No. 200,424, filed Nov. 19, 1971, in behalf of J. D. Harnden, Jr. et al., titled SOLID STATE INDUCTION COOKING APPLIANCES AND CIRCUITS (RD–4678). The entire right, title and interest in and to the inventions described in the aforesaid patent applications, as well as in and to the aforesaid applications, and the entire right, title and interest in and to the invention hereinafter described, as well as in and to the patent application of which this specification is a part, are assigned to the same assignee.

BACKGROUND OF THE INVENTION

This invention pertains, generally, to induction cooking; and, more particularly, to an induction cooking appliance including vessel supporting means having combined therewith a temperature sensing unit for sensing, or detecting, the temperature of a cooking vessel, or utensil, supported by said supporting means; said vessel including at least one part thereof in which a change in at least one optical property thereof is caused by changing the temperature of the vessel. Prior art electric ranges (i.e., those employing resistance heater surface elements) and gas ranges present many problems in respect of sensing, or detecting, the temperature of a cooking vessel, or utensil, rested on the range counter and being heated. The following problems are among those presented:

First, with prior art electric and gas ranges, the temperature sensing means and its associated components are directly heated, spuriously, in some measure by a high temperature heating source. For example, in the conventional electric range a temperature sensing unit is situated at the center of a spiral resistance heating coil. The heating coil and temperature sensing unit are both located on the top, or working, surface of the range counter and a cooking vessel rests on and contacts the heating coil as well as the temperature sensing unit. Although the temperature sensing unit directly contacts the heated cooking vessel, it is also subjected to direct, or spurious, heating by the range's resistance heating coil; e.g., by radiation and convection. In addition, the temperature of the temperature sensing unit is influenced by, among other things, the metallic counter top of the electric range; the temperature sensing unit being mounted on the metallic counter top. Similarly, in a gas range the flames directly heat the temperature sensing unit and heated metallic gridirons as well as the metallic counter top thermally influence the temperature sensing unit. Suffice it to say that: with prior art electric and gas ranges the primary heating source spuriously heats the temperature sensing unit and other heated parts of the range thermally perturb the temperature sensing unit as well.

Second, in prior art electric and gas ranges, because of the nature and proximity of the primary heating source, various component parts of the temperature sensing unit have to be fabricated with materials which are capable of withstanding relatively high temperatures; e.g., approximately 1400°F. to 1600°F. For example, in the conventional electric range wherein the temperature sensing unit is located at the center of a spiral resistance heater coil which is, in turn, located in the metallic counter top of the range, the temperature sensing unit and its associated components are subjected to the elevated temperatures hereinbefore set forth and significant thermal stresses are induced in the temperature sensor as well as in its associated components. Epoxies, plastics, polymides and untreated glass, among others, are not employable. Similar conditions are presented with gas ranges. Suffice it to say that: because of the relatively high temperatures involved in prior art electric and gas ranges, the materials from which temperature sensors and their associated components may be fabricated are rather limited.

Third, in prior art electric and gas ranges, principally because of the nature and proximity of the primary heating source, the temperature sensing unit and its associated components are required to have extensive thermal shielding, or insulation, to minimize the influences of spurious heating by the high temperature heating source as well as by the metallic range counter and the gridirons. Without some effective thermal shielding, or insulation, the temperature sensing unit will provide a false temperature indication unless temperature compensation is appropriately applied. However, temperature compensation is not feasible because of the wide range of cooking conditions. Moreover, without effective thermal shielding severe thermal stresses induced in the various components of the temperature sensing unit will cause a disabling, and sometimes destruction, of the temperature sensing unit. Suffice it to say that: because of the relatively high temperatures involved in prior art electric and gas ranges the temperature sensing units employed therein require effective thermal shielding or insulation.

Fourth, prior art temperature sensing units, especially those employed in the conventional electric range, are generally rather sophisticated, mechanically, and are of a somewhat complex structure and arrangement. The high temperature environment within which the temperature sensing unit is located permits severe thermal stresses to occur in the various components of the temperature sensing unit. These stresses tend to promote warping of the various components. For example, because of the aforesaid thermal stresses a relatively massive double spring arrangement is employed in combination with a temperature responsive device. The temperature responsive device acting against spring restraint contacts the bottom surface of the cooking vessel which rests, or is seated, on a flat spiral heating coil, as well as on the temperature responsive device, disposed on the top surface of the range counter. The massive double spring arrangement is rather stiff (i.e. has a relatively high restoring force or relatively large effective spring constant) and this is due in large part to the need to make the arrangement structurally resistant to thermal deformation. Such a stiff spring arrangement generally functions satisfactorily to enable the temperature sensing unit to maintain forceful contact with a regular flat bottom surface of a relatively heavy cooking vessel such as a cast iron pot containing foodstuff to be cooked. Being in contact with the bottom surface of the vessel or pot, it is conceptually possible for the temperature sensing unit to detect the temperature of the vessel. However, in the event that a relatively lightweight pot or vessel is used, or if a vessel having a rather irregularly contoured bottom surface is used, such prior art temperature sensing units employing the aforesaid stiff spring arrangement prove to be unsatisfactory. For example, if a cooking vessel is used which is not sufficiently heavy, there will be insufficient weight to adequately compress the spring arrangement and one consequence will be that the vessel will not rest on the resistance heating coil in the most intimate contact possible therewith. The cooking vessel will, as a result, be raised or tilted, and thereby allow very inefficient heat transfer between the heating coil and the vessel. Suffice it to say that: because of the relatively high temperatures involved and because of the consequent thermal stresses created with such prior art ranges as have been hereinbefore described, it is not practical to provide temperature sensing units having simple spring arrangements having little stiffness, or small restoring force.

SUMMARY OF THE INVENTION

Although the invention is hereinafter described and illustrated in the accompanying drawing figures as being embodied in an induction stove or range, it is, nevertheless, to be understood that the invention's applicability is not limited to induction cooking ranges but may be embodied in, for example, trivet warmers, portable counter top warming or cooking appliances as well as in other apparatus which need not necessarily be used for cooking food.

One object of the invention herein set forth is the provision of a cooking appliance having a temperature sensing unit for sensing or detecting the temperature of a vessel or utensil being heated and wherein the temperature sensing unit is free from spurious heating.

Another object of the invention herein set forth is the provision of a cooking appliance having a temperature sensing unit for sensing or detecting the temperature of a vessel or utensil being heated, said temperature sensing unit being relatively remote from said heated vessel or utensil.

Another object of the invention herein set forth is the provision of a cooking appliance having a temperature sensing unit for sensing or detecting the temperature of a vessel being heated, the materials of fabrication of said temperature sensing unit not being restricted in the same way as in prior art electric and gas ranges.

Another object of the invention herein set forth is the provision of a cooking appliance having a temperature sensing unit for sensing or detecting the temperature of the vessel or utensil being heated, said temperature sensing unit not requiring thermal shielding or insulation in the ways or to the extent employed in prior art electric or gas ranges.

Another object of the invention herein set forth is the provision of a cooking appliance having a temperature sensing unit for sensing or detecting the temperature of a vessel or utensil being heated, said temperature sensing unit being capable of accurately sensing the temperature of the vessel regardless of whether said vessel be of light weight and/or whether the vessel has an irregular surface; said temperature sensing unit not requiring the prior art spring construction or arrangement.

Another object of the invention is to provide a cooking appliance having support means, such as a counter, having an uninterrupted top or working surface.

The invention illustratively embodied as hereinafter described attains the aforementioned objects, among others, in that there is provided an induction cooking appliance for heating vessel which includes at least one portion in which electric current may be induced for the purpose of heating said one portion and to vary at least one optical parameter, or property, of said one portion in response to the heating of the one portion. The appliance is comprised of vessel supporting means in which no substantial heating current is induced when it is subjected to a changing magnetic field. In one embodiment the supporting means is provided with a surface on which the vessel is supported and the supporting means also includes a passage extending therethrough and defining at said surface a first opening as well as defining at another end of the passage a second opening in the supporting means. At least a part of said one portion of the cooking vessel is proximate to said first opening when the vessel is supported on said surface so that from said part of the vessel's one portion there extends a light propagation path which is comprised of said first opening, said passage, and said second opening. Near the supporting means there is located an induction coil which is energizable for generating a changing magnetic field in said one portion of the supported vessel whereby heating current is induced in said one portion and said optical parameter, or property, is thereby varied. Means are provided for the purpose of energizing the coil with electric power of at least ultrasonic frequency. A source of light is provided for directing light through said path and onto said part of the vessel. Finally, detecting means are provided and said detection means are coupled with at least said second opening in the supporting means for receiving propagated light reflected from said part of said one portion of said heated vessel. The reflected light propagated from said part of said one portion of said vessel being modulated in accordance with the temperature-correlated variance of said optical parameter of said vessel whereby the temperature of said vessel is determinable.

In accordance with another embodiment a vessel supporting means is provided which is provided which has no passage therethrough. This supporting means allows the directed and reflected light to be transmitted therethrough.

Other objects as well as a fuller understanding of the invention will appear by referring to the following description, claims, and drawing figures.

DESCRIPTION OF THE DRAWING FIGURES

DESCRIPTION OF PREFERRED EMBODIMENT

Figure 1:
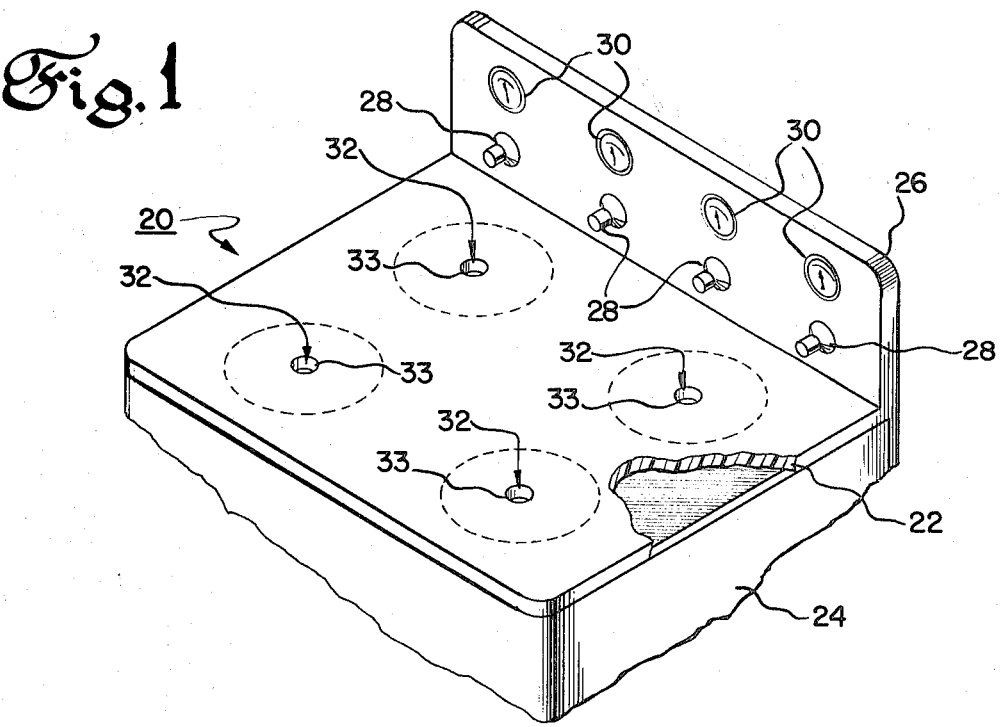
FIG. 1 is a perspective view of an upper part of an induction cooking range showing, among other things, the range counter and the top or working surface thereof.
Figure 2:
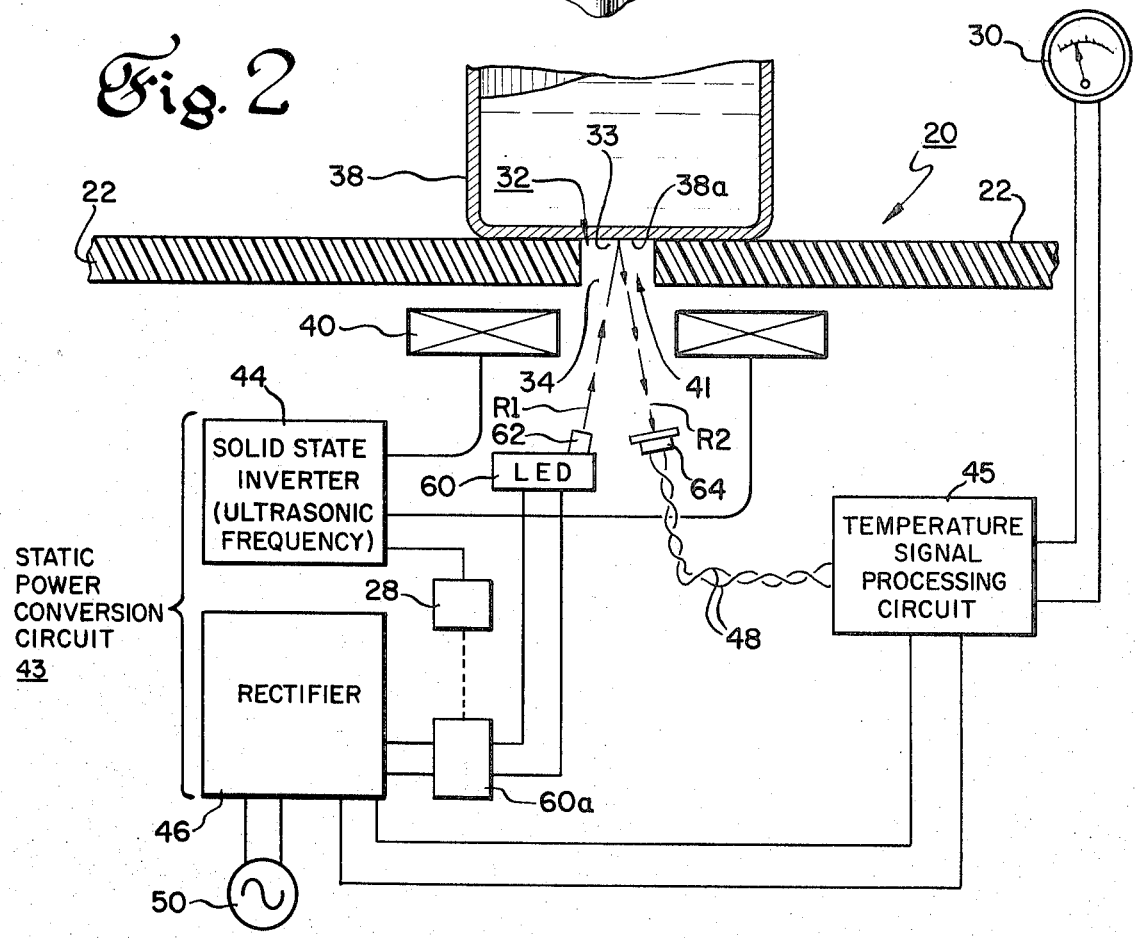
FIG. 2 is in part a block diagram of a portion of the induction cooking range of FIG. 1 showing, among other things, an enlarged cross section of the cooking vessel employed in the present invention, said vessel resting on the range counter proximate to the temperature sensing unit incorporated therein.

Shown in FIG. 1 is an induction cooking range according to the present invention and it is designated, generally, by the reference number 20. Range 20 includes a counter 22, or vessel supporting means, which is suitably supported on substructure 24. Fastened to substructure 24 is a panel 26. On panel 26 there is mounted a number of controls 28 and a like number of dial-type thermometers 30. On the top, or working surface, of counter 22 there is illustrated four dotted line circles. These circles are intended to suggest locations where four cooking vessels 38, such as pots, pans, etc., may be positioned during the cooking process. At the center of each dotted line circle in counter 22 there is located a passage 32 or aperture. Passage 32 extends completely through counter 22, as shown at FIG. 2, and defines a first opening 33 and the top surface of counter 22 as will as a second opening 34 at the bottom surface of the counter. Resting on the top surface of counter 22 is a cooking vessel 38. As shown in FIG. 2, the bottom surface of the vessel 38 covers the first opening 33 in the counter 22. Located below counter 22 and separated from the bottom surface thereof by an air gap is a flat spiral induction coil 40 which includes at the center thereof a central aperture generally designated by the reference number 41. As indicated, aperture 41 is directly in line with the passage 32. In other words, aperture 41 is in register with passage 32.

Coil 40 is electrically coupled to the output of a solid state inverter 44 which, in turn, has an input which is electrically coupled to the output of a rectifier 46. Inverter 44 may be a solid state inverter and as combined with rectifier 46 it forms a static power conversion circuit which is designated, generally, by the reference number 43. Rectifier 46 includes an input which is electrically coupled to a conventional a-c source 50 which is a 60 Hz, single phase, 110 or 220 volt source. More specific details of the static power conversion circuit 43 may be had by referring to the patent applications hereinbefore cross-referenced.

Also shown in FIG. 2 is a control 28 which may, for example, be a switch which is electrically coupled with inverter 44 for the purpose of controlling the flow of electric power to the induction coil 40. The control 28 enables the housewife to "call for" a certain temperature or temperature range, or band, inasmuch as the control 28 is graduated in degrees F. or in ranges of degrees F. However, a thermometer 30 associated with a particular control 28 actually displays the temperature attained by the vessel 38; the thermometer 30 also indicating the rate of temperature rise and drop, which is an important control parameter. Rectifier 46 may, for example, be a regulated, full-wave bridge rectifier employing solid state devices and operating to convert an A.C. input to a regulated D.C. output. The inverter 44 may employ SCR's which enable the inverter 44 to deliver a relatively high frequency (i.e., ultrasonic or above) power output to drive the induction coil 40.

Also shown in FIG. 2 is a temperature signal processing circuit 45 which includes: a first input coupled with rectifier 46 and deriving therefrom a source of D.C. voltage; a second input in the form of a twisted pair of electrical conductors 48 extending from a silicon photodiode 64 to the signal processing circuit 45; and, an output directly coupled to a dial type thermometer 30. As hereinbefore stated, thermometer 30 may be an electrical thermometer which is suitably graduated in degrees F. Also provided is a light emitting diode 60, or LED which, as indicated, is coupled to an output of rectifier 46. Optically coupled with LED 60 is a collimating lens 62 or focussing lens which directs light rays, such as the ray R1, toward the vessel 38. For example, a light ray R1 emanating from LED 60 passes through the lens 62 as well as through the aperture 41 and passage 32 and it impinges on a coating 38a, or film, on the bottom surface of the cooking vessel 38. As hereinafter explained, the light ray R1 is "modulated" or changed in character such that it becomes the ray R2 which is reflected or redirected from the coating 38a back through the passage 32 and central aperture 41 onto the silicon photodiode 64. The photodiode 64 shown in the drawing figures is, in its preferred form, a silicon photodiode. Advantageously, the silicon photodiode is stable and has a relatively fast response time. The photodiode 64 changes its effective impedance or resistance, as a function of the intensity of light or radiation to which it is exposed. For example, when exposed to monochromatic light its effective resistance will diminish as light intensity increases. The photodiode 64 behaves the same way in the presence of any color visible light, not just monochromatic light. However, the use of monochromatic light is preferred in the embodiments shown at FIGS. 2 and 4 for the reasons hereinafter set forth, the LED 60 being the source of monochromatic light employed in the embodiments of the invention illustrated at FIGS. 2 and 4.

By employing monochromatic light filters need not be used. Also, there is no need to use a light light-tight box arrangement to shield, or otherwise contain, LED 60, lens 62, aperture 41, passage 32 and photodiode 64; i.e., to shield all of the aforementioned from stray, spurious or ambient light. Moreover, by using monochromatic light, the photodiode 64 can more readily descriminate the presence of such light from other stray, spurious or ambient light. The LED 60 can provide monochromatic light in a variety of different colors (i.e., wavelengths) of the spectrum by application of different voltages thereto. This is discussed in more detail hereinafter.

Mechanically ganged with the control 28 (FIG. 2) is another control 60a which is also operated when control 28 is manipulated to vary the voltage across LED 60 thereby causing LED to emit light of different colors corresponding to the voltage applied thereto. Thus, when the housewife sets control 28 to a preselected temperature, for example, the ganged control 60a caused LED 60 to emit a corresponding preselected color.

Figure 3:
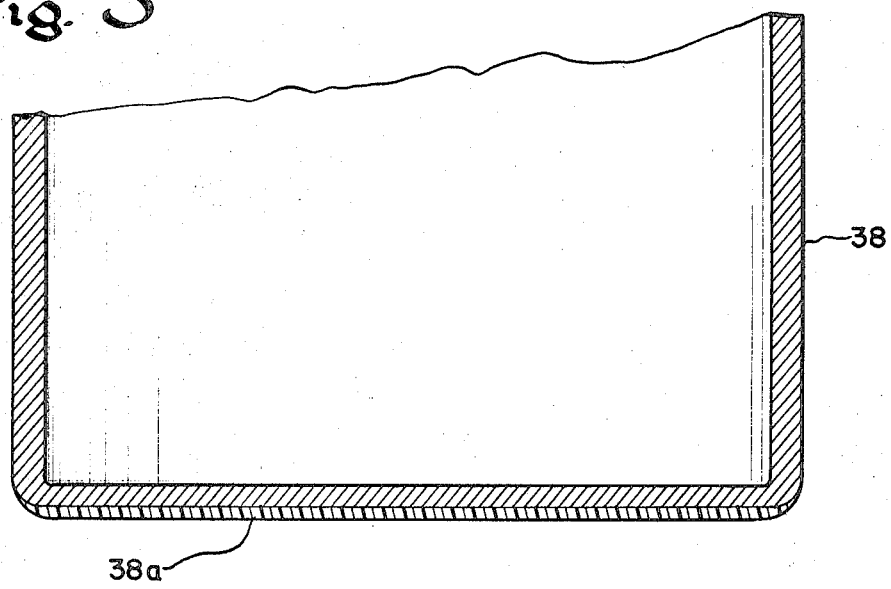
FIG. 3 is an enlarged cross section of the cooking vessel employed in the present invention.

In FIG. 3 the vessel 38 is shown as having a coating 38a on the bottom thereof. The nature of the coating 38a, which is discussed in detail hereinafter, is such that as its temperature is changed, due to heating of vessel 38, at least one optical parameter or property is correspondingly changed. For example, the coating 38a may be a coating of liquid crystals which exhibit color changes in response to temperature changes. Such liquid crystal materials are available from, among other sources, the Vari-Light Corporation, 9790 Conklin Road, Cincinnati, Ohio. The liquid crystal materials supplied by the aforesaid company have the property of scattering light of various colors over a specific temperature range, the color varying with temperature within the range. Advantageously, the liquid crystals respond rapidly to temperature changes by reflecting visible light of different colors. In applying the liquid crystal coating to the bottom surface of the vessel 38, one procedure is to start with a liquid crystal solution and apply the solution to the bottom of vessel 38 by spraying, brushing, painting or dipping. When the applied solution containing the liquid crystals has dried there will remain on the bottom of the pan a coating or film 38a. A convenient temperature rnage of interest in cooking is from 180°F. to 450°F., approximately (82.2°C. to 232.2°C. approximately). Cholesteric liquid crystal solutions suitable for providing thermally responsive visible color changes through the aforementioned temperature range are available from the Vari-Light Corporation hereinbefore identified. The coating 38a resulting from the dried solution of the liquid crystals as applied to vessel 38 will change color in sequence as temperature increases. Moreover, this color change-temperature change response is reversible. Advantageously, the coating 38a has a relatively long life period. Other sources of liquid crystals for purposes of the subject invention are available from: The Capsular Products Division of the National Cash Register Co., Dayton, Ohio; and, Aseptic Thermo Indicator Co., 11471 Vanowen Street, North Hollywood, California. As another alternative, coating 38a may be a thermochromic ceramic material.

Operationally, monochromatic light represented by the ray R1, provided by LED 60 and directed through lens 62 onto the coating 38a, is, in effect, modulated by the coating 38a in the sense that light represented by the reflected ray R2 is "modulated." Specifically, the directed light represented by the ray R1 is scattered by the liquid crystal structure of the coating 38a and the light represented by the ray R2 which is reflected to the photodiode 64 is of a particular wavelength or color corresponding to the temperature of the coating. As the temperature of the coating 38a changes, the reflected light represented by the ray R2 is of a different wavelength, or different color, corresponding to the new temperature of the coating 38a. Thus, the photodiode 64 changes its impedance as a function of the temperature-correlated wavelength of the light represented by the ray R2 to which the photodiode 64 is exposed. Thus, the light which is reflected from the coating 38a can be considered as modulated light and represented by the ray R2. In effect, the ray R2 represents temperature-modulated light.

Advantageously, the use of directed and reflected light exemplified by rays R1 and R2 enables signal transmission of temperature data in radiant or light energy as distinguished from the energy supplied by the induction coil 40. Thus, crosstalk and other such interference problems are obviated.

Another advantageous aspect of the invention is that when control 28 is set thereby setting control 60a also, the LED 60 emits a preselected color of directed light R1. With photodetector 64 set to detect maxima or minima (nulls) in relation to the reflected light R2 of the same color as ray R1, the signal processing circuit can, if desired, deliver a feedback signal to initiate appropriate control action.

Figure 4:
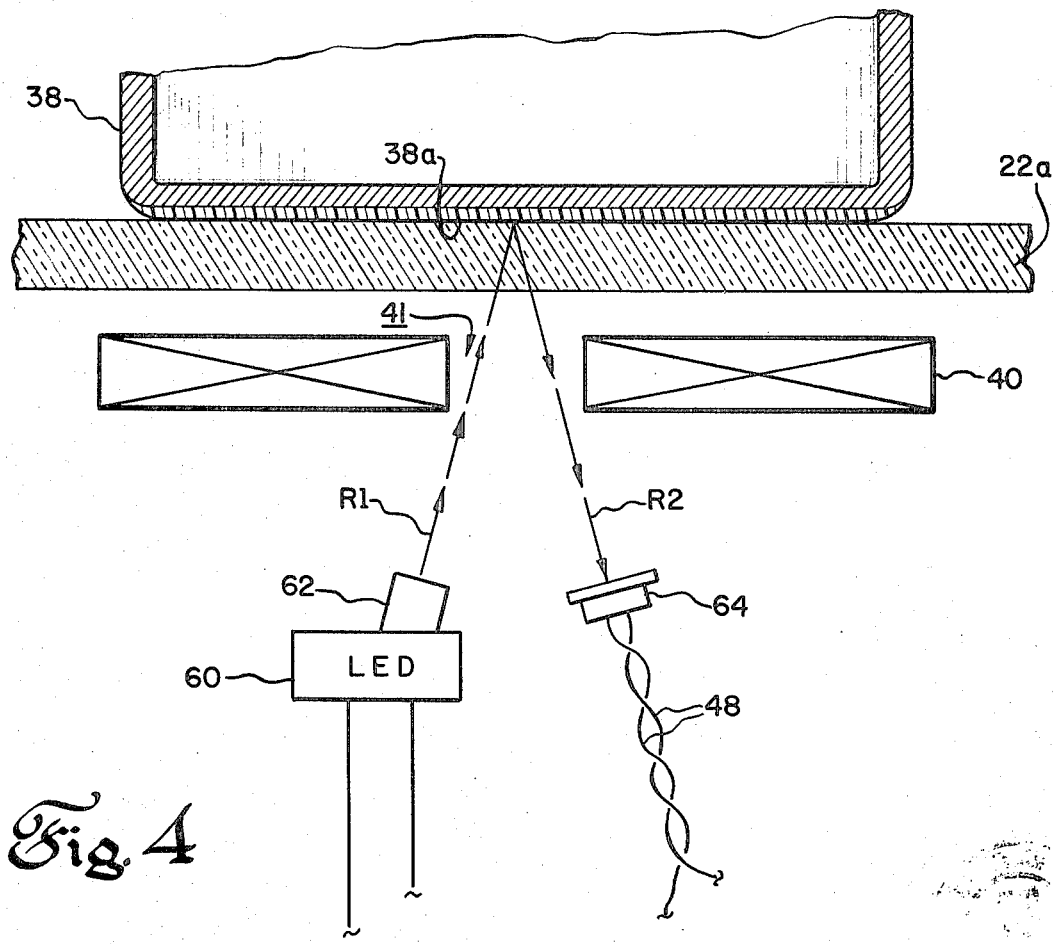
FIG. 4 is a view similar to a part of the view shown in FIG. 2 and illustrating a modification of the counter of the range of FIG. 2.

In FIG. 4 there is illustrated another embodiment of the invention wherein the counter 22, shown in FIGS. 1 and 2, is replaced by a modified counter 22a. The counter 22a does not have the passage 32 which is provided in counter 22 of FIG. 2. In FIG. 4 the counter 22a is fabricated of a light transmitting material such as, for example, glass which has been suitably treated to withstand the temperatures to which the vessel 38 will be elevated due to the induction heating process. The counter 22a is also nonconductive electrically so that heating currents will not be induced therein by the action of the induction coil 40. However, the material (such as glass or quartz) of counter 22a possesses light transmission properties suitable for allowing coating 38a of vessel 38 to be illuminated by light from LED 60 and also to enable light reflected from coating 38a (modulated light) represented by ray R2 to be detected by the photodiode 64.

Although the invention has been described and illustrated by way of specific embodiments thereof, it is to be understood that many changes in the details of construction as well as in the combination and arrangement of parts, or components, as well as in any materials of fabrication may be made without departing from the spirit and scope of the invention as it is hereinafter claimed.

What is claimed is:

1. An induction cooking appliance, for heating a cooking vessel having at least one portion thereof in which electric current may be induced to heat said one portion and to vary at least one optical parameter of said portion in response to the temperature thereof, comprising: vessel supporting means in which no substantial heating current is induced when said supporting means is subjected to a changing magnetic field, said supporting means having a surface on which said vessel is supportable and a passage extending through said supporting means and defining at said surface a first opening and also defining a second opening at another end of said passage, at least a part of said one portion of said vessel being proximate said first opening when said vessel is supported on said surface so that from said part there extends a light propagation path which is comprised of said first opening, said passage, and said second opening; an induction coil energizable for generating a changing magnetic field in said one portion of the supported vessel whereby heating current is induced in said one portion and said one optical parameter is varied; means for energizing said coil with electric power of at least ultrasonic frequency; and means, coupled with said light propagation path, for detecting temperature-correlated changes in said optical parameter.

2. The appliance according to claim 1 further comprising signal means, coupled with said means for detecting temperature correlated changes, for generating a signal representative of the temperature of said one portion corresponding to the change in the optical parameter thereof.

3. The appliance according to claim 2 wherein said means for detecting temperature correlated changes includes a light source and light responsive means, said light source being arranged to direct light through said propagation path onto said part of said one portion whereat said part reflects said directed light as modulated light which includes information as to the temperature of said part of said one portion corresponding to a change in said optical parameter, said light responsive means receiving said modulated light, and, in turn, modulating said signal means.

4. The appliance according to claim 3 wherein said light source is comprised of light emitting diode.

5. The appliance according to claim 3 wherein said light source includes a lens for directing light from said light source through said propagation path and on to said part of said one portion of said vessel.

6. The appliance according to claim 3 wherein said light responsive means is comprised of a photodiode.

7. The appliance according to claim 3 wherein said light source emits monochromatic light.

8. The appliance according to claim 3 wherein said light source is comprised of a light emitting diode which emits monochromatic light and wherein said light responsive means is comprised of a photodiode.

9. The apparatus according to claim 8 wherein said optical parameter is color.

10. An induction cooking appliance, for heating a cooking vessel having at least one portion thereof in which electric current may be induced to heat said one portion and to vary at least one optical parameter of said portion in response to the temperature of said one portion, comprising: vessel supporting means in which no substantial heating current is induced when said supporting means is subjected to a changing magnetic field, said supporting means having a surface on which said vessel is supportable, said supporting means being comprised of a material which transmits light; an induction coil energizable for generating a changing magnetic field in said one portion of the supported vessel whereby heating current is induced in said one portion and said one optical parameter is varied; means for energizing said coil with electric power of at least ultrasonic frequency; and, means, optically coupled with said vessel supporting means, for detecting temperature-correlated changes in said optical paramater.

11. The appliance according to claim 10 further comprising: signal means, coupled with said means for detecting temperature correlated changes, for generating a signal representative of the temperature of said one portion corresponding to the change in the optical parameter thereof.

12. The appliance according to claim 11 wherein said means for detecting temperature correlated changes includes a light source and light responsive means, said light source and light responsive means, said light source being arranged to direct light through said light transmitting vessel supporting means onto said one portion of said vessel whereat said one portion reflects said directed light as modulated light through said vessel supporting means, said modulated light including information as to the temperature of said one portion corresponding to a change in said optical parameter, said light responsive means receiving said modulated light, and, in turn, modulating said signal means.

13. The appliance according to claim 12 wherein said light source is comprised of a light emitting diode which emits monochromatic light and wherein said light responsive means is comprised of a photodiode.

14. The appliance according to claim 10 wherein said optical parameter is color.

15. An induction cooking appliance, for heating a cooking vessel having at least one portion thereof in which electric current may be induced to heat said one portion and to vary the color of said one portion in response to the temperature thereof, comprising: a light transmitting counter in which no substantial heating current is induced when said counter is subjected to a changing magnetic field, said counter having an uninterrupted surface on which said vessel is supportable; an induction coil energizable for generating a changing magnetic field in said one portion of said supported vessel whereby heating current is induced in said one portion and the color of said one portion is varied; means for energizing said coil with electric power of at least ultrasonic frequency; a light emitting diode emitting monochromatic light through said counter and onto said one portion of said vessel, said heated one portion of said vessel reflecting the monochromatic light directed thereat by said light emitting diode through said counter; light responsive means for receiving the reflected light transmitted through said counter from said heated one portion; and, signal means coupled with said light responsive means for generating a signal representative of the temperature of said one portion of said vessel corresponding to the color of said one portion.

16. In combination with a cooking vessel including at least one portion thereof in which electric current may be induced by a changing magnetic field to heat said one portion and to vary the temperature thereof, said vessel including a coating on said one portion which changes color in response to the temperature of said one portion, an induction cooking appliance comprising: light-transmitting vessel supporting means in which no substantial heating current is induced when said supporting means is subjected to a changing magnetic field, said supporting means having a surface on which said vessel is supportable; an induction coil energizable for generating a changing magnetic field in said one portion of the supported vessel whereby heating current is induced in said one portion and said coating changes color in response to the temperature of said one portion; means for energizing said coil with electric power of at least ultrasonic frequency; and, means, optically coupled with said light-transmitting supporting means, for detecting temperature-correlated color changes of said coating.

17. The combination according to claim 16 wherein said coating is comprised of liquid crystals which change the color of said coating in response to the temperature thereof.

18. The appliance according to claim 6 further comprising means for varying the color of the light emitted by said light emitting diode and wherein said optical parameter is color.

19. The appliance according to claim 13 further comprising means for varying the color of the light emitted by said light emitting diode and wherein said optical parameter is color.

* * * * *